Aug. 14, 1934.   J. C. CAROTHERS   1,969,923
BRAKE BEAM SAFETY SUPPORT
Filed Feb. 1, 1930
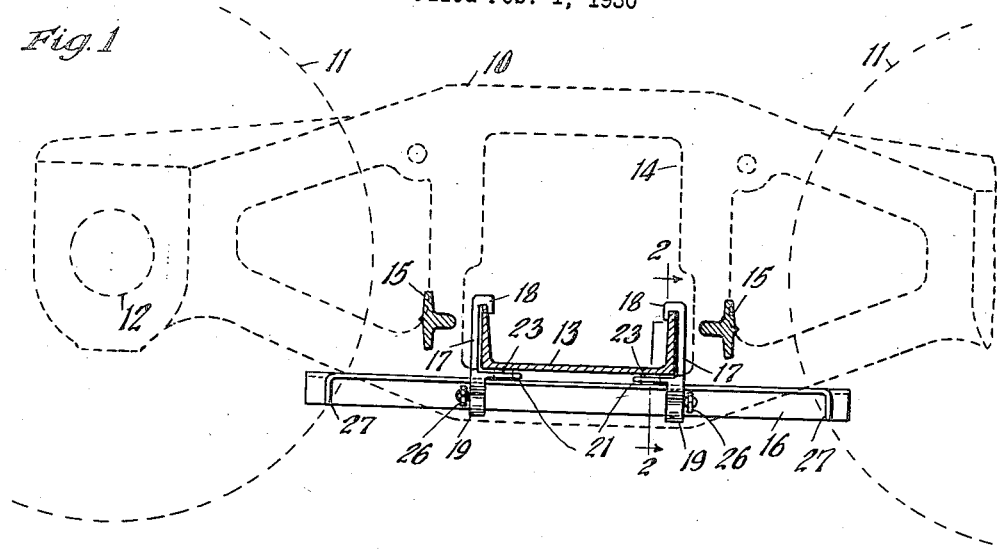
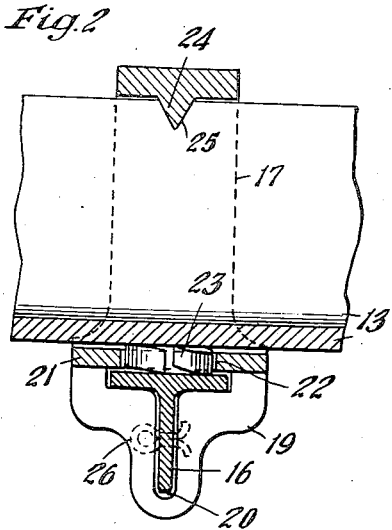
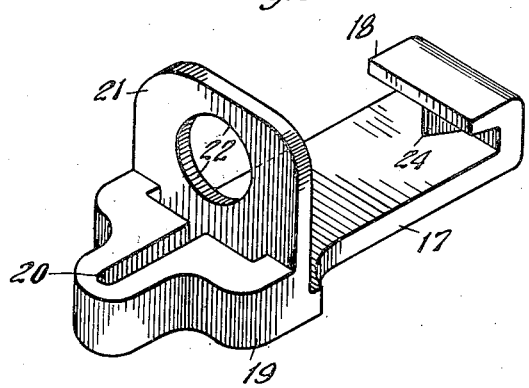
Inventor
John C. Carothers
By Joseph Harris
His Atty.
Witness
Wm. Geiger Patented Aug. 14, 1934

1,969,923

UNITED STATES PATENT OFFICE 1,969,923

BRAKE BEAM SAFETY SUPPORT

John C. Carothers, Ranger, Tex.

Application February 1, 1930, Serial No. 425,119

2 Claims. (Cl. 188—210)

This invention relates to brake beam safety supports, especially adapted for railway cars and engine tenders.

In railway car construction, it is substantially the universal practice to provide some safety means for supporting the usual brake beams when they become accidentally detached, to prevent the same from dropping on to the rails, thereby causing derailments and serious accidents. A serious defect in devices of this kind now employed is that they frequently become detached or lost, thus not being available when required. Some of such devices now used include short chain members fastened with nuts to the brake beam and truck bolster on the car or angle member riveted to the bottom of the spring channel. When chains are employed, the nuts often are lost off the bolts and thus the safety support for the brake beam is destroyed. When angle irons are used as safety supports, they often become loose due to vibrations and frequently become worn to such an extent that they no longer give effective support to the brake beams when the same become accidentally detached. It is further pointed out that workmen in making repairs and replacements on cars often remove the supports and either do not replace the same or when replaced use bolts and nuts to secure the same, which soon become detached, due to truck vibrations.

It is one object of my invention to overcome the defects hereinbefore pointed out by providing a brake beam safety supporting device or means which effectively prevents the brake beam when accidentally detached from dropping on to the rails and which is of simple construction and efficient and reliable in operation, and is so designed that it cannot become accidentally lost or detached.

A further object of the invention is to provide a safety supporting means, which when applied to railway cars or engine tenders will be maintained in position indefinitely without special attention.

A still further object of the invention is to provide a safety supporting means for brake beams, including a supporting bar or channel member disposed beneath the usual brake beams in such position that the brake beams if accidentally detached will drop thereon and be supported thereby, wherein the supporting bar is suspended from the usual spring plank of the truck by means of a pair of brackets hung on the spring plank and held in position thereon by a hook member formed integral with each bracket, and further having means associated therewith for preventing displacement of said hook members lengthwise of the spring plank.

Another object of the invention is to provide in a device of the character described in the preceding paragraph yielding means between the safety supporting bar or beam and the bottom face of the spring plank to hold the parts against vibration and maintain the same in position.

Other objects of the invention will more clearly appear from the description and claims hereinafter following.

In the drawing, forming a part of this specification, Figure 1 is a transverse, sectional view through a portion of the truck structure of a railway car, illustrating my improvements in connection therewith, the truck structure and associated parts being illustrated in dotted lines in said figure. Figure 2 is an enlarged, vertical, sectional view corresponding substantially to the line 2—2 of Figure 1. And Figure 3 is a detailed, perspective view of a hanger or bracket member employed in connection with my improvements.

In said drawing, 10 designates generally the side frame member of the truck structure, 11—11 the car wheels and 12 the axle member. The usual spring plank is indicated by 13 and is accommodated in the usual openings 14 provided in the side frame structure of the truck. The usual spring members which cooperate with the plank 13 and associated parts are not illustrated in the drawing. The brake beam members are indicated by 15—15 and are disposed in the usual position at opposite sides of the spring plank member 13. As will be understood, the brake beams 15 are provided with the usual brake shoes, not shown, which cooperate with the wheels 11 of the truck. The brake beams 15 are movably supported from the truck structure in the usual manner.

In carrying out my invention, I provide a pair of supporting bars 16—16 at opposite sides of the truck, which project laterally beyond the spring plank member at opposite sides and underlie the brake beam members 15—15. As will be understood, two of such supporting bars are preferably employed, the same being located respectively at opposite sides of the truck, so that when the brake beams 15—15 drop, they will be supported at opposite ends. Each supporting bar 16 is suspended from the spring plank by a pair of brackets 17—17 disposed at opposite sides of said plank. As clearly shown in Figures 2 and 3, each bracket member 17 comprises a shank portion of plate-like form having an inwardly extending portion with a down turned outer flange at the upper end thereof forming a hook member 18 adapted to engage over the top of the corresponding upstanding flange of the spring plank member. At the bottom end, each bracket 17 is thickened as indicated at 19, said thickened portion being provided with a T-shaped slot 20 adapted to receive the supporting bar member 16. As shown, the bar 16 is of T-shape cross section so as to fit said slot. Above the slotted portion, the bracket 17 is provided with a laterally inwardly extending shelf or table 21, which normally engages beneath the bottom side of the spring plank member 13. As clearly shown in Figures 2 and 3, the shelf 21 is provided with an opening 22 within which a spring washer member 23 is disposed. When the parts are assembled, the T-shaped supporting bar extends through the aligned slots 20—20 of the two brackets at each end of the spring plank and bears on the bottoms of the spring washers 23—23, thereby pressing the latter against the bottom face of the spring plank. As will be evident, the parts are thus held yieldingly in position by the spring washer members, thereby preventing rattling and jarring of the same. In order to prevent longitudinal displacement of the brackets 17—17 on the flanges of the spring plank, each bracket is provided with a depending tooth member 24 located within the hook portion thereof and engaging within a notch 25 provided in the upper edge portion of the corresponding flange of the spring plank.

In order to maintain the bar 16 in position after the same has been assembled with the bracket 17, I preferably employ a pair of cotter pins 26—26 extending through the vertical flange of said bar outwardly of the brackets 17 and closely adjacent the same. In order to give further assurance that the bar 16 will not become detached and lost, the upper flange portion thereof is slotted for a short distance at opposite ends, at opposite sides of the vertical flange, and the slotted sections are bent downwardly at right angles, as indicated at 27—27, and as clearly shown in Figure 1, thereby preventing the bar from passing through the slots 20 of the brackets.

In applying my improved supporting means to the truck structure of a railway car, the brackets 17 are first applied, the hook member of each bracket being engaged over the upper portion of the corresponding flange of the spring plank, while the shelf 21 of said bracket is disposed outwardly of the spring plank. After having engaged the hooks with the flanges, the brackets 17 are swung inwardly so as to engage the shelves thereof beneath the bottom of the spring plank. The spring washers 23 are then inserted within the openings 22 of the shelves of the brackets and the bar 16 is inserted through the slots 20 at the lower ends of the brackets, and positioned as shown in Figure 1. The cotter pins 26—26 are then applied and the slotted end portions of the horizontal flange of the bar 16 downturned, as indicated in Figure 1.

In case it is found necessary to remove one or both of the brake beam members 15, the same may be readily accomplished without entirely detaching the supporting bar 16, it being necessary only to remove the cotter pins 26—26 and displace the member 16 inwardly to either side to permit dropping of the corresponding brake beam member 15. In case only one of the brake beam members is to be removed, the cotter pin 26 of the corresponding side of the supporting member 16 is removed and the member 16 slid inwardly to its limit, thereby clearing the space below the brake beam which may then be detached.

As will be evident, when either of the brake beams 15 becomes accidentally detached the same can drop only such a distance that it will engage the supporting bar 16 and cannot drop onto the rails and cause damage and derailment of the car. As will be evident, vibrations will have no effect on my improved hanger arrangement for the brake beam safety support, there being no securing members employed which may become accidentally detached or broken.

I have herein shown and described what I now consider the preferred manner of carrying out my invention, but the same is merely illustrative and I contemplate all changes and modifications that come within the scope of the claims appended hereto.

I claim:

1. In a brake beam safety support for railway cars, the combination with a truck member including a channel shaped spring plank and a pair of brake beams at opposite sides of said plank; of a bar member disposed below said spring plank and projecting beyond opposite sides thereof; brackets for supporting said bar from the spring plank, each of said brackets having a hook portion engaging over one of the upstanding flanges of the spring plank, said brackets having alined slots in the bottom ends thereof through which said bar extends; yielding means interposed between said bar and spring plank; and means on said brackets for holding said yielding means in position.

2. A bracket for brake beam supporting means adapted to be attached to the spring plank of a car truck and having means thereon for supporting a bar extending beneath the brake beams, said bracket comprising a shank portion having an inturned hook member at the upper end adapted to engage over the flange of the spring plank; a tooth adapted to engage a notch on the spring plank, said bracket being transversely slotted at the bottom to receive the supporting bar; and an inwardly extending shelf above said slotted portion adapted to engage beneath the spring plank, said shelf being provided with an opening forming a seat for a spring member.

JOHN C. CAROTHERS.